United States Patent [19]
Bentivoglio

[11] Patent Number: 6,153,093
[45] Date of Patent: Nov. 28, 2000

[54] FILTER SCREEN PACK FOR EXTRUSION DIE

[76] Inventor: Alfredo Bentivoglio, 1530 Watersedge Road, Missisauga, Ontario, Canada, L5J 1A4

[21] Appl. No.: 08/863,942

[22] Filed: May 28, 1997

[51] Int. Cl.[7] .............................. B01D 35/16; B29C 47/68
[52] U.S. Cl. ...................... 210/108; 210/107; 210/333.1; 425/197; 425/199
[58] Field of Search ...................... 425/197, 198, 425/199; 210/106, 107, 108, 136, 333.1

[56] References Cited

U.S. PATENT DOCUMENTS

| | | | |
|---|---|---|---|
| 4,057,379 | 11/1977 | Sato | 425/199 |
| 4,752,386 | 6/1988 | Schulz et al. | 210/108 |
| 4,849,113 | 7/1989 | Hills | 210/741 |
| 4,973,406 | 11/1990 | Ponzielli | 210/333.1 |
| 5,141,631 | 8/1992 | Whitman | 210/108 |
| 5,462,653 | 10/1995 | Hills | 210/85 |

*Primary Examiner*—Harold Pyon
*Assistant Examiner*—Joseph Leyson
*Attorney, Agent, or Firm*—Anthony Asquith & Co.

[57] ABSTRACT

The filter intercepts dirt emanating from a molten-polymer extruder. The filter is clamped between perforated support plates, and a rotor sweeps the holes in the upstream plate. The rotor defines a cavity which communicates with a small sector of the holes at any one time. The cavity is openable to drain, via a valve. The melt is under high pressure, to which the cavity is exposed. The rotor is rotated by a drive-shaft, and the drain is located co-axially with the drive-shaft.

9 Claims, 4 Drawing Sheets

FILTER SCREEN PACK FOR EXTRUSION DIE

BACKGROUND TO THE INVENTION

Screen Changers are known, in which a screen is placed in the conduit conveying the flow of melt to the die. In a conventional screen changer, two separate screens are provided, together with a changeover system, which may be manually or otherwise operated.

When the extruder is shut down temporarily, for example when cleaning the die nozzle or to change the colour of the material or to a different melt material, the opportunity can be taken to snap the screens over, whereby the clean screen is interposed in the conduit, in place of the dirty screen. Now, the dirty screen can be taken out, cleaned, and replaced, ready for re-use.

In some cases, it is desired to change the screen at a time when the extruder is not otherwise shut down. Designs have been made in which it is possible to change the screens while melt continues to flow. One major problem with change the screen while the melt flow continues is that the change affects the flow. Even if the change is done very quickly, the pulse caused by the change can affect the resulting extruded product.

Besides, the momentary disruption is not the only problem. Even if the short pulse disruption can be minimized, the pressure/flow characteristics of the new screen are never quite the same as those of the old (dirty) screen. As a result, the final product emerging from the die nozzle might not, after the change-over, have the same film thickness, through-flow rate etc.

Also, on the practical side, the type of screen system that permits change-over of the screens has been notoriously difficult to seal, and the problem of leakage of melt from the screen changer housing can be tiresome.

It is recognized that when the die is producing short batch runs, the screen can be changed between batches, and the screen can remain clean for the length of the batch. But for long or continuous production, the need to change the screen during operation arises; the quick change screen system is not very satisfactory, but is in widespread use for long runs because of the lack of an alternative.

U.S. Pat. No. 4,332,541 (Anders, 1982) shows an example of a prior art screen pack, in which a reverse-pressure back-flushing phase of operation is automatically incorporated into the extrusion process, and this is used to clean out debris that may have accumulated in the screen. The idea is that, as a result of the periodic back-flushing, the screen can be kept cleaner, longer.

DETAILED DESCRIPTION OF PREFERRED EMBODIMENTS

This invention can be described in detail via explanation of apparatuses and exemplary embodiments as shown in accompanying drawings. It should be noted that the scope of the invention is defined by the accompanying claims, and not necessarily by specific features of exemplary embodiments.

Figure 1:
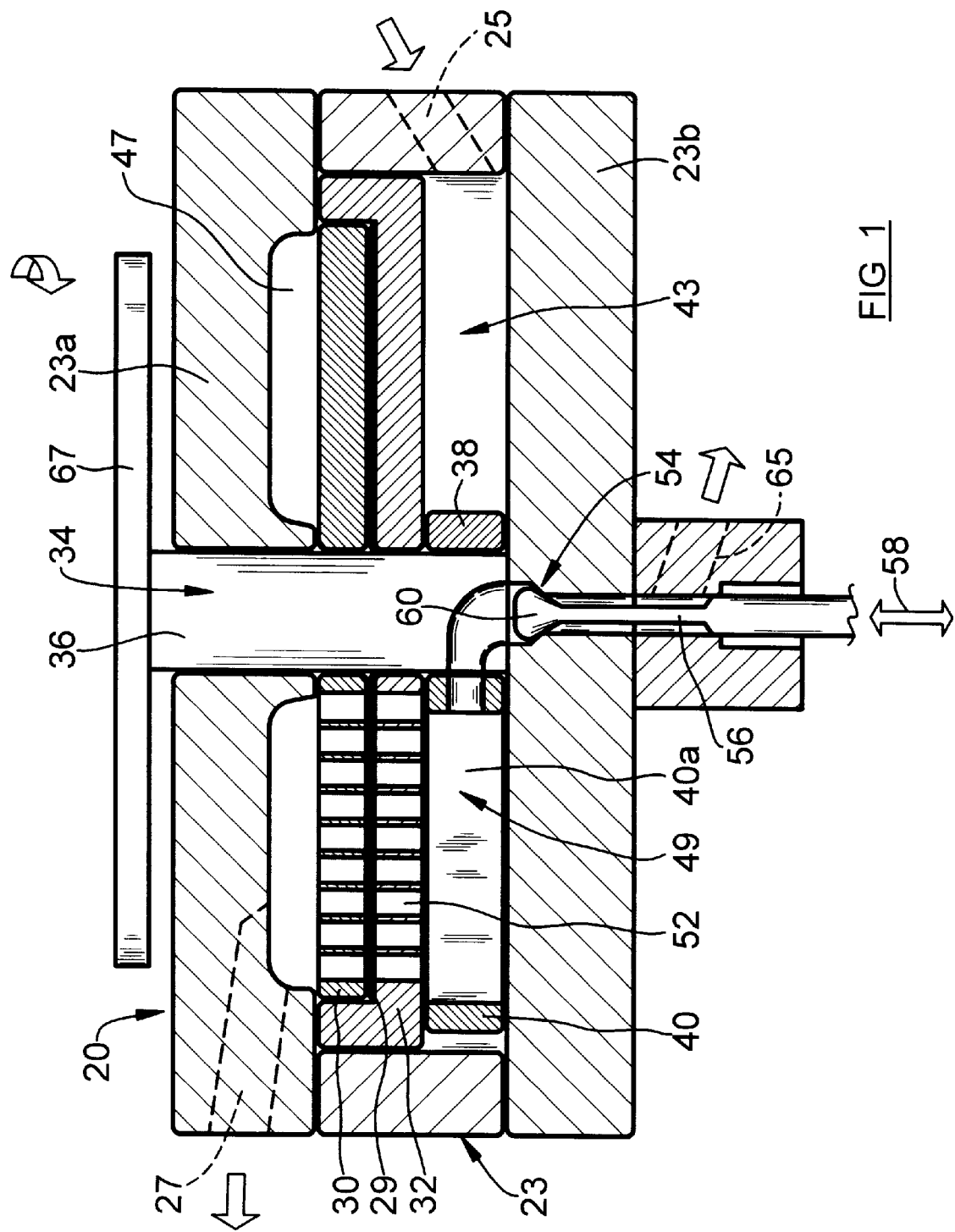
FIG. 1 is a cross-section of an apparatus for screening or filtering dirt and debris out of the flowing melt.

FIG. 1 shows a self-cleaning screen unit 20, which is suitable for installation between the extruder screw and the extrusion die.

The unit 20 includes a static housing 23, which has a port 25 for receiving the hot melt from the screw. The filtered and screened melt, having passed through the unit, leaves via an exit port 27, whence it enters the extrusion die.

A screen or filter pack 29 comprises several layers of filter screen mesh. The pack 29 lies sandwiched between the upper 30 and lower 32 screen supports. In line with the terminology used with conventional screen changers, the upper screen support 30 may be termed the breaker plate, and the lower screen support 32 may be termed the facing plate.

A rotor 34 includes a shaft 36, which is mounted and guided for rotation within the housing component 23a. At the bottom end of the shaft is a spider 38, having three radial arms, one 40 of which is shown in FIG. 1. When the shaft 36 rotates, the spider 38 sweeps the chamber 43 created between the lower screen support 32 and the base plate 23b of the housing 23.

In use of the unit 20, hot liquid melt from the screw enters, under high pressure, via port 25. The melt enters and fills the chamber 43. From the chamber 43, the melt passes through the filter mesh pack 29, and passes into discharge chamber 47. From there, the melt exits to the die via port 27.

The filters in the filter pack 29 gradually become clogged with debris that is present in the melt emanating from the screw. The filters are cleaned by a pressure-reverse, back-flush procedure, as will now be described.

Figure 3:
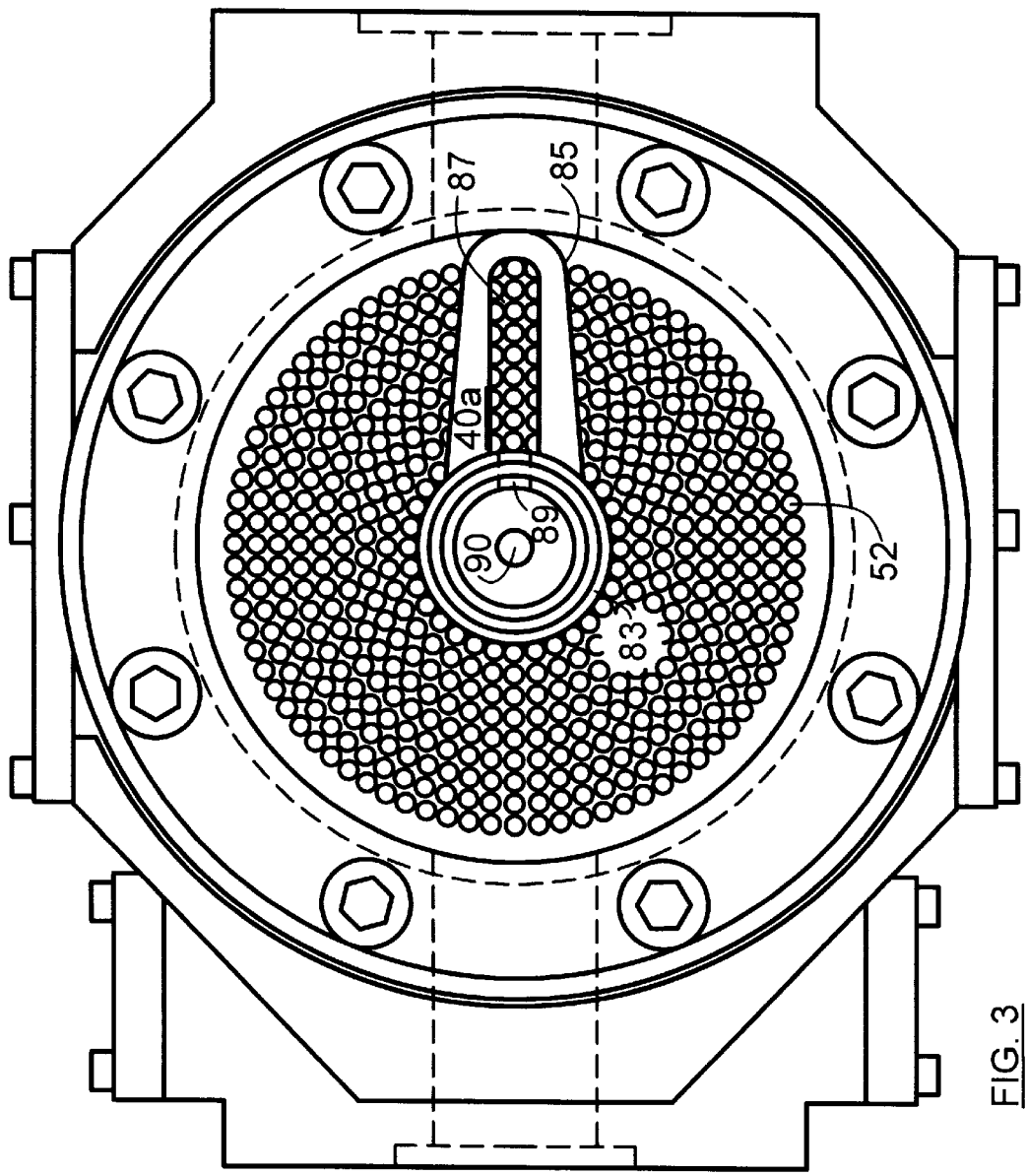
FIG. 3 is a sectioned plan view of the apparatus of FIG. 2.

The radial arm 40 actually comprises two arms 40a, side by side, with a cavity 49 between. FIG. 3 shows a comparable shape of arm 85, in another self-cleaning screen unit. As the spider 38 rotates, some of the holes 52 in the lower screen support 32 lie open to the cavity 49 between the arms 40a, the rest of the holes 52, i.e. the holes in the screen support that do not lie over the cavity 49 being open, of course, to the chamber 43. Melt therefore enters and fills the cavity 49, and this charge of melt is carried around with the radial arm 40 as the spider rotates.

The cavity 49 is normally closed, but the cavity can be opened to exhaust by opening the exhaust valve 54.

To open the valve 54, valve stem 56 is activated upwards. The activation is done by means of a pneumatic ram, or other suitable mechanism 58. The stem 56 is normally (i.e. when not activated upwards), urged downwards by means of a spring within the mechanism 58, whereby the valve head 60 is urged normally into sealing contact with the valve seat.

When the valve 54 is opened, the cavity 49 is connected to drain 65, and the pressurized melt in the cavity spurts out of the drain 65. The sudden drop in pressure within the cavity causes a surge of melt from the discharge chamber 47 to pass through whichever of the wholes 52 happen to coincide with the cavity at the time when the valve is opened. It is this surge of reverse pressure that back-washes the dirt out of the filter pack; that is to say, the surge back-washes the dirt out of that portion of the filter pack that coincides with, the cavity.

The valve 54 should not be kept open for long time, because when the valve is open the melt has an easy escape path to the drain, with the result that the melt flow to the die might be attenuated, or perhaps might cease altogether. Therefore, the valve should only be opened for short pulse time, e.g. for a few milliseconds. The shorter the pulse, the less likely it is that there will be any perceptible change in the flow of melt through the nozzle of the extrusion die.

It is important that the flow through the die nozzle not be affected, because a sudden drop in melt pressure at the die nozzle will inevitably have an effect on the quality of the extruded product.

It is recognized that the pulse should be of short enough duration that no significant pressure or flow effect is felt at the die nozzle, and yet the pulse should be long enough duration to create enough of a back-flush effect to make sure the dirt trapped in the filter pack is vigorously dislodged and cleared.

It is recognized that in the apparatus as described an optimized pulse length can be achieved that is neither too long nor too short from these standpoints.

One of the reasons the pulse can be so effective to clear the dirt, and yet not affect the flow through the die nozzle, is that the volume of the cavity 49 is much smaller than the volume of the bulk of the pressurized melt. The volume of the cavity 49 is a few ccs, whereas the total volume of the pressurized melt, in the unit 20 and in the die, is of the order of a liter or more.

Because the valve 54 is so close to the cavity 49, and the volume of the cavity is so small, the instant the valve 54 opens, the pressure in the cavity 49 drops very rapidly. However, there is a much larger volume of melt at the high pressure i.e. the melt emerging from the screw, the melt in the chambers 43, 47, the melt in the conduits leading to the die, and melt in the die itself etc. This large quantity of high pressure melt serves as a reservoir, to dampen out pressure pulses or surges. The reservoir effect is not large, of course, but it is recognized that, in the unit, the reservoir of high pressure melt in the system is so much greater than the volume of the cavity 49 that the pulse can be short enough to cause very little, or no, pressure drop in the melt in the die, and yet that same pulse is long enough to allow the pressure in the cavity to drop to zero.

The important effect of the pulse is to create a vigorous back-flow through some of the holes in the screen supports. The back-flow only lasts for a moment, but it is recognized that is sufficient to dislodge the dirt from the filter pack.

The valve 54 should be large. If the valve seat were small (for example, less than about 6 mm diameter), flow through the valve might be over-restricted, and prevent the desired rapid drop in pressure in the cavity 49 when the valve is opened. On the other hand, if the seat were too large (e.g. more than about 12 mm diameter), the pressure might drop so rapidly in the cavity that the pressure in the bulk of the melt would be affected. Such an effect could be alleviated by making the pulse duration even shorter (i.e. by moving the valve head very quickly), but then mechanical problems might arise.

The pulse length may be set such that the quantity of melt discharged through the valve during one pulse is less than the volume of the cavity 49. In that case, if the cavity were, say, 6 cc in volume, and the volume discharged per pulse were, say, 2 ccs, not all the melt in the cavity would be discharged each pulse, whereby the melt in the cavity would work its way progressively to the drain.

Although the pulses should be of short duration, the pulses may, on the other hand, be frequent. If the melt is especially dirty, the frequency may be stepped up. Generally, the designer would arrange that the control of the pulse-duration, pulse-frequency, speed of rotation of the spider, etc., would be under the automatic control of pressure-differential sensors which detect when the filters are becoming clogged.

The rotor 34 is caused to rotate (slowly) by means of a suitable rotary drive, which engages the gear wheel 67 attached to the shaft 36.

As the rotor 34 rotates, the cavity 49 comes under the different ones of the holes 52, and the designer should arrange the pattern of holes in relation to the profiles of the cavity, such that all the holes 52 are exposed from time to time. This can be done by random, or programmed, operation, as required.

An option that may be preferred, when they are, say, three radial arms to the spider, is to assign the respective arms each to sweep only a particular annulus. Thus, the cavity in the first arm only covers the radially-outermost holes in the screen support, the cavity in the second arm covers only the holes that lie within the middle diameters of the screen support, and the cavity in the third arm covers the holes in the innermost diameters.

Figure 2:
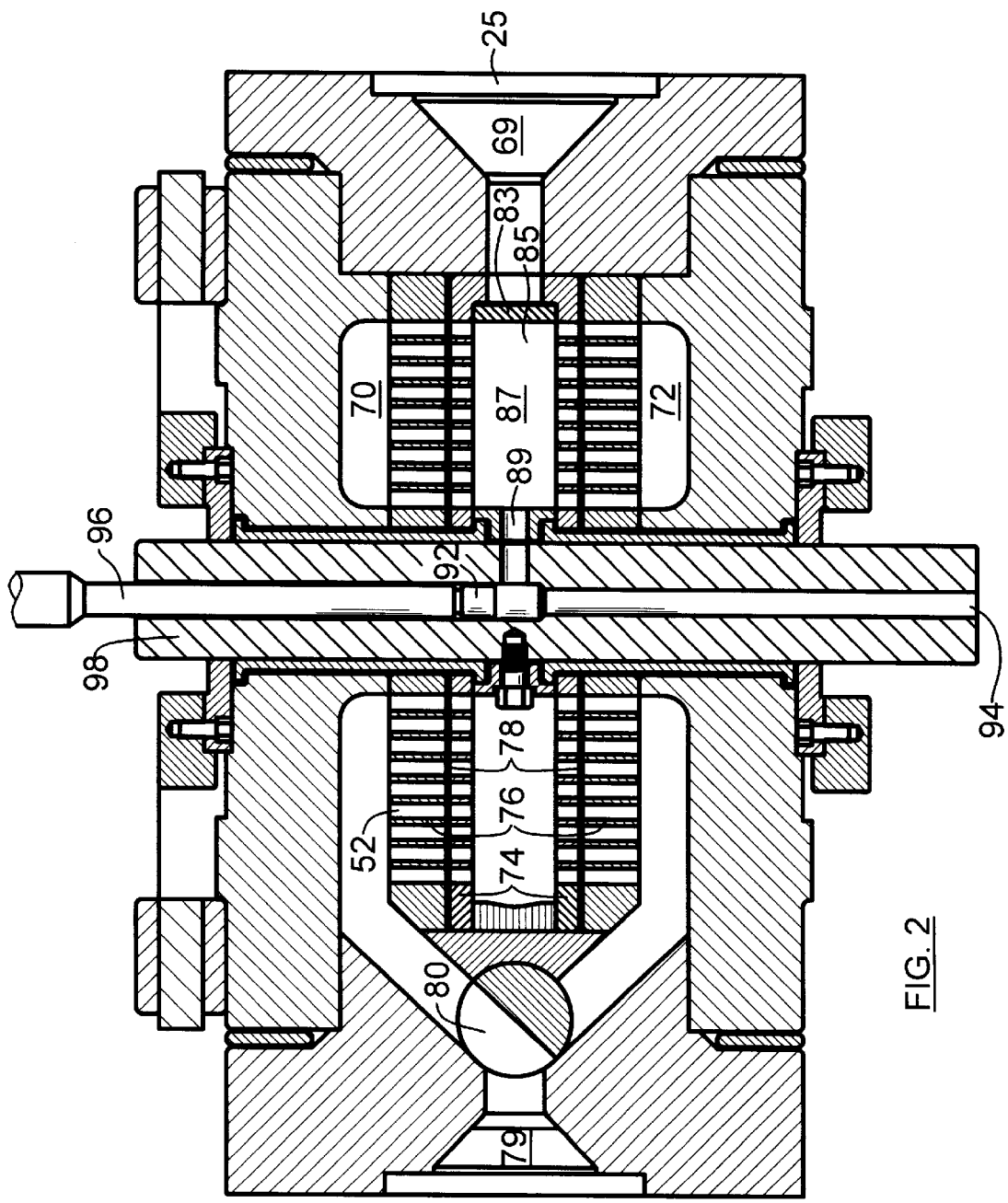
FIG. 2 is a similar cross-section of another apparatus.

FIGS. 2 and 3 show another self-cleaning screen unit. Melt from the extruder screw enters via port 25, into the inlet chamber 69. Some of the melt then flows upwards, through the upper screen, into the upper discharge chamber 70, and the rest downwards, through the lower screen, into the lower discharge chamber 72.

The melt passes through holes 52 in the respective inner and outer screen support plates 74, 76, and through the respective mesh screen filter packs 78 sandwiched between the pairs of support plates.

The melt flowing through the two chambers 70, 72 then comes together in conduit 79, and from there passes to the extrusion die. An operable selection valve 80 enables the flow from one or other of the chambers 70, 72 to be cut off from entering the conduit 79.

The spider 83 includes a radial arm 85, which is hollow inside, thereby defining a cavity 87. The radial arm is arranged to be a tight sliding fit between the inner screen support plates 74, whereby the cavity is sealed between the plates. The cavity is open to the holes 52 in the plates (FIG. 3), under which the cavity lies, but the cavity is closed to the incoming melt present in the inlet chamber, and is closed to all the other holes 52 in the plates.

The passage 89 communicates the cavity 87 with a valve chamber 90. A valve 92 is pressed against a seat, and closes the cavity 87 from the drain 94. The valve 92 is operated by means of a plunger 96, to which is coupled a suitable pneumatic ram or other actuator.

The spider 83 is mounted on a shaft 98 for rotation, in the manner as described with reference to FIG. 1. The shaft is driven into rotation by means of a motor and gearbox, which may be mounted on top of the apparatus.

The spider of the rotor is very tightly confined between the screen supports, in order to minimize leakage. The shaft of the rotor also is very tightly confined in the housing.

In order to prevent binding, therefore, preferably the designer should see to it that the shaft is coupled to the spider by means of a rotary motion-transmitting connection with the spider, and not by being coupled rigidly to the spider.

In the various designs, the rotor may be set to rotate continuously, or may be set to rotate only when the filters need cleaning. Continuous motion of the rotor is preferable, to make sure pockets of stagnant melt do not develop.

Figure 4:
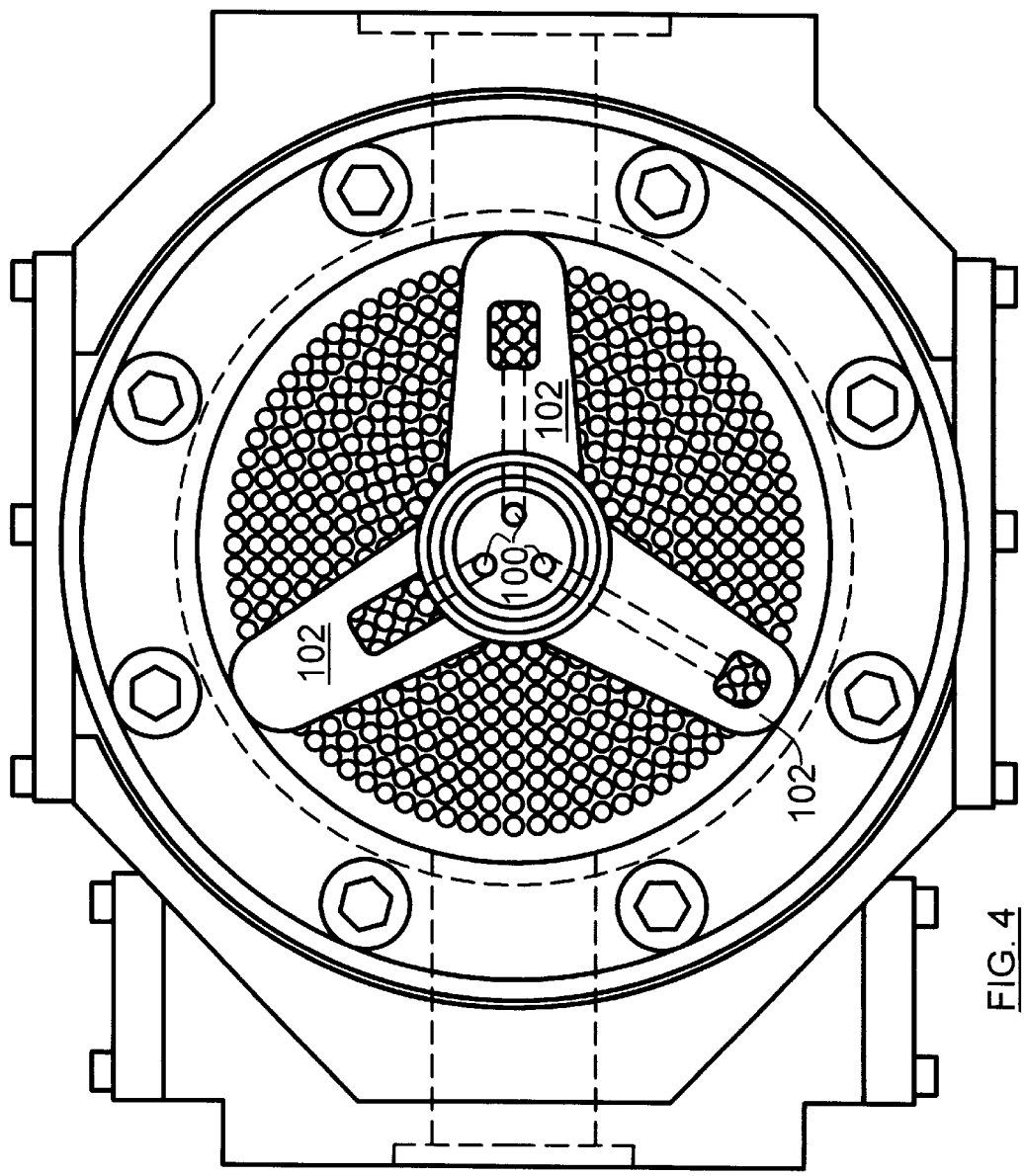
FIG. 4 is a sectioned plan view of another apparatus.

In the alternative apparatus shown in FIG. 4, separate exhaust valves 100, one for each radial arm 102 are provided. In this case, the exhaust valves may be timed differently. The exhaust valve 100 corresponds to the arm 102 whose cavity 104 sweeps the holes in the middle diameters of the screen support. Similarly, another of the exhaust valves corresponds to the arm whose cavity sweeps the holes in the innermost diameters of the screen support. Another exhaust valve handles the cavity that sweeps the outermost holes. The "middle" exhaust valve, and even more so the "outer" exhaust valve, may be programmed to open more frequently than the "inner" exhaust valve, to accommodate the greater number of holes at the larger diameters.

In the embodiments as shown, one design aim is that any leakage that might occur past the screen-to-support interface goes into the melt-flow, not to the drain, and certainly not to the outside of the housing in which the screen is contained. Leakage past the filters is not important, since any gaps through which the melt may leak are themselves small enough to act as filters, the important aspect is that there are no gaps through which melt could leak to the outside, In the embodiments as shown, the spider is confined between the support plates. The spider should be made a shade thinner than the distance between the support plates, in order that the spider can rotate without binding. Accurate, precision machining of the components is therefore required; however, as shown, the components of the apparatus which have to be precisely sized, accurately flat, and parallel-faced, are all shaped so as to be readily manufacturable in that mode.

In a case where it is desired not to rely on accurate-to-size machining, it may be preferred to spring-load the support plate or plates onto the spider. In FIG. 1, for example, it will be apparent that springs could readily be inserted between the upper plate of the housing and the screen support plate, so as to compress the spider between the screen support plate and the base plate.

The torque needed to turn the spider depends on the friction between the spider and the facing plates. The more tightly the spider is squeezed between the facing plates, the more torque is required. In fact, to prevent the melt from by-passing the filters, the spider must be confined quite tightly between the facing plates. As the spider rubs heavily against the facing plates, some wear can take place, the debris from which passes into the melt stream. Therefore, the designer should arrange that the rubbed surfaces are upstream of the filters, as shown in the embodiments.

The double-pack arrangement as depicted in FIGS. 2, 3 is more efficient in this sense than the single-pack arrangement of FIG. 1. Given that there are two rubbing surfaces per spider (i.e. top surface and bottom surface), the apparatus can be made more efficient, in terms of size, and in terms of torque required to turn the spider, for a given through-flow, if filter packs are placed both sides of the spider.

The apparatuses as described are good for long runs, where colour changes of the extruded plastic material are not frequent. Although the units are not suited for frequent changes of extruded material, in fact colour changes etc., can be accommodated to some extent, in that, for change-over, the drain can be kept open a little longer than usual, to back-flush out the debris, and to flush out the last remnants of the previous colour. Besides, by the use of the invention, the filter may be so clean that no extra flushing is required.

What is claimed is:

1. Apparatus for filtering dirt from a high-pressure flowing liquid polymer, wherein:

the apparatus includes a filter screen, which is of suitable mesh for filtering out and retaining particles of dirt in the liquid passing through the screen;

the apparatus includes an entry port for receiving the liquid, and a delivery chamber for receiving liquid that has passed through the filter screen;

the disposition of the apparatus is such that the liquid in the delivery chamber is under a relatively high pressure;

the apparatus includes an upstream plate, which is located upstream of the filter screen;

the upstream, plate has an upstream surface, which faces away from the filter screen;

the upstream plate is perforated with many holes, through which the liquid passes prior to entering the filter screen;

the many holes have respective mouths, which open from the upstream surface of the upstream plate;

the apparatus includes an arm;

the apparatus includes a means for creating relative rotary motion between the upstream plate and the arm;

the arrangement of the apparatus is such that the said rotary motion is motion in which a rubbing surface of the arm rubs relatively against the upstream surface of the upstream plate, and is motion in which the rubbing surface of the arm sweeps relatively over the mouths of the holes in the upstream plate, thereby covering and uncovering the holes;

the rubbing surface of the arm is configured as a relatively narrow land;

the land is so shaped as to enclose an arm-area, and the arm includes an arm-cavity, which is open to the holes in the plate that lie within the arm-area enclosed by the land;

the disposition of the holes in the upstream plate, in relation to the disposition of the arm-area enclosed by the land, is such that, at one operational moment, most of the many holes in the upstream plate lie closed from the arm-area but lie open to a flow of liquid from the entry port, through the screen, and into the delivery chamber, and is such that, at the same moment, a few of the many holes in the upstream plate lie closed from the entry port but lie open to the arm-area;

the arrangement of the apparatus is such that the arm-cavity is closed or sealed from the liquid in the entry port while being open to the holes in the upstream plate enclosed within the arm-area;

whereby, as the upstream plate is swept by the arm, each of the holes in the upstream plate periodically lies enclosed within the arm-area and open to the arm-cavity;

the apparatus includes a drain-passageway, which comprises a means for communicating the arm-cavity to a relatively low pressure drain, for conveyance of liquid away from the arm-cavity;

the means for creating relative motion includes a means for configuring the arm as a rotor and the upstream plate as a stator;

the means for creating relative motion includes a rotor guide-means, for guiding and constraining the rotor for rotary movement relative to a frame of the apparatus, and includes a means for preventing the stator from rotating relative to the frame;

the means for creating relative motion includes a rotary drive-shaft;

the means for creating relative motion includes a shaft guide-means, for guiding and constraining the drive-shaft for rotation relative to the frame;

the means for creating relative motion includes a rotary drive-motor, for driving the drive-shaft;

the means for creating relative motion includes a means for drive-coupling the drive-shaft to the rotor.

2. Apparatus of claim 1, wherein the axis of rotation of the rotary drive-shaft and the axis of rotation of the rotor are co-axial, and the axes are perpendicular to the upstream surface of the upstream plate.

3. Apparatus of claim 1, wherein:

the frame of the apparatus includes a wall that defines an enclosed hollow interior, in which are located the delivery chamber, the filter, the upstream plate, and the arm;

the drive-shaft has an inside-portion located inside the hollow interior, and an outside-portion located outside the hollow interior;

the drive-motor is located outside the hollow interior;

and the drive-shaft passes through the wall.

4. Apparatus of claim 1, wherein the filter screen lies clamped between the upstream plate and a downstream plate, which has holes corresponding to the holes in the upstream plate.

5. Apparatus of claim 4, wherein all the holes in the downstream plate, including the holes in the downstream plate that correspond to those holes in the upstream plate lying momentarily within the arm-area, remain at all times during operation open to the delivery chamber, and exposed to the relatively high pressure therein.

6. Apparatus of claim 1, wherein:

the drain-passageway includes a stator-drain-passageway, which is located in the frame of the apparatus;

the drain-passageway includes a rotor-drain-passageway, which is located in the rotor;

the stator-drain-passageway and the rotor-drain-passageway are so structured as to remain in liquid-transmitting communication during rotation of the rotor;

the rotor-drain-passageway communicates with the arm-cavity, the configuration thereof being such that liquid in the arm-cavity flowing towards the drain flows towards the rotary axis;

and the stator-drain-passageway is located, in the frame, on or adjacent to the rotary axis.

7. Apparatus of claim 1, wherein the apparatus includes a means for rotating the rotor at a constant speed, whereby the holes in the plate are covered and uncovered in such a manner that, during movement of the rotor, the flow rate of liquid through the apparatus remains substantially constant.

8. Apparatus of claim 1, wherein the apparatus includes a drain-tap means for operably opening and closing the drain-passageway.

9. Apparatus of claim 8, wherein the apparatus includes a means for operating the drain-tap means for periodic short bursts of time.

* * * * *